US011503154B1

(12) United States Patent
Krebs et al.

(10) Patent No.: US 11,503,154 B1
(45) Date of Patent: *Nov. 15, 2022

(54) INDEPENDENT NOTIFICATION SYSTEM FOR AUTHENTICATION

(71) Applicant: United Services Automobile Association (USAA), San Antonio, TX (US)

(72) Inventors: Emily Kathleen Krebs, San Antonio, TX (US); Stacy Callaway Huggar, San Antonio, TX (US); Jeffrey Neal Pollack, San Antonio, TX (US); Yevgeniy Viatcheslavovich Khmelev, San Antonio, TX (US); Mark Anthony Lopez, Helotes, TX (US); Ryan Thomas Russell, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/210,247

(22) Filed: Mar. 23, 2021

Related U.S. Application Data

(63) Continuation of application No. 16/842,613, filed on Apr. 7, 2020, now Pat. No. 10,986,226.

(60) Provisional application No. 62/830,646, filed on Apr. 8, 2019.

(51) Int. Cl.
*H04M 3/436* (2006.01)
*H04M 1/56* (2006.01)
*H04M 15/06* (2006.01)
*H04M 3/42* (2006.01)

(52) U.S. Cl.
CPC ....... *H04M 3/436* (2013.01); *H04M 3/42042* (2013.01); *H04M 2201/42* (2013.01); *H04M 2203/6027* (2013.01)

(58) Field of Classification Search
None
See application file for complete search history.

(56) References Cited

U.S. PATENT DOCUMENTS 10,986,226 B1* 4/2021 Krebs ................. H04M 3/436
2012/0144198 A1* 6/2012 Har .......................... H04L 9/14
713/170

(Continued)

*Primary Examiner* — Quoc D Tran
(74) *Attorney, Agent, or Firm* — Potomac Law Group, PLLC

(57) ABSTRACT

When a customer service representative (CSR) calls a customer, the customer may be able to authenticate himself or herself by providing the CSR with personal identifying information. However, the CSR may be unable to provide information to authenticate himself or herself to the customer. Thus, this patent document describes authentication techniques that can allow the CSR to authenticate himself or herself to the customer. For example, before or during a call that the second person (e.g., CSR) initiates to call a first person (e.g., customer), a notification message may be sent to the first person's user device. The content of notification message displayed on the user device may provide information to the first person which can allow the first person to determine whether the second person is trustworthy.

20 Claims, 6 Drawing Sheets

(56) References Cited

U.S. PATENT DOCUMENTS

2014/0187203 A1* 7/2014 Bombacino ......... H04L 63/0428
455/411
2018/0205822 A1* 7/2018 Gupta ................... H04M 3/382

* cited by examiner

INDEPENDENT NOTIFICATION SYSTEM FOR AUTHENTICATION

CROSS-REFERENCE TO RELATED APPLICATIONS

This application is a continuation of U.S. patent application Ser. No. 16/842,613, filed Apr. 7, 2020, entitled "INDEPENDENT NOTIFICATION SYSTEM FOR AUTHENTICATION," which is a non-provisional of and claims priority to U.S. Provisional Application No. 62/830,646, filed on Apr. 8, 2019, entitled "INDEPENDENT NOTIFICATION SYSTEM FOR AUTHENTICATION," which are hereby incorporated by reference in their entireties for all purposes.

TECHNICAL FIELD

This disclosure is directed generally to systems, methods, and apparatuses for performing authentication.

BACKGROUND

When a customer calls an organization's customer service phone number, he or she is asked to provide certain personal information about himself or herself so that a customer service representative can determine that the customer is who he or she says. In this way, a customer service representative can authenticate the identity of the customer calling. In some cases, customer service representatives call customers for marketing purposes (e.g., to sell additional products or finalize transaction), for notification purposes (e.g., to notify a customer of a suspected credit card fraud) or to collect information for a service or product they are providing. Customers who receive such calls may implicitly trust the customer service representative at least because the customer service representative's claim that he or she belongs to a trustworthy organization (e.g., the customer's bank) or because of the reason for the customer service perspective's call (e.g., to notify of a credit card fraud). Fraudsters know about this phenomenon and call the customers pretending to be affiliated with the organization that the customer trusts. Thus, customers who receive such calls are susceptible to having their personal sensitive information stolen by the fraudsters.

Figure 1:
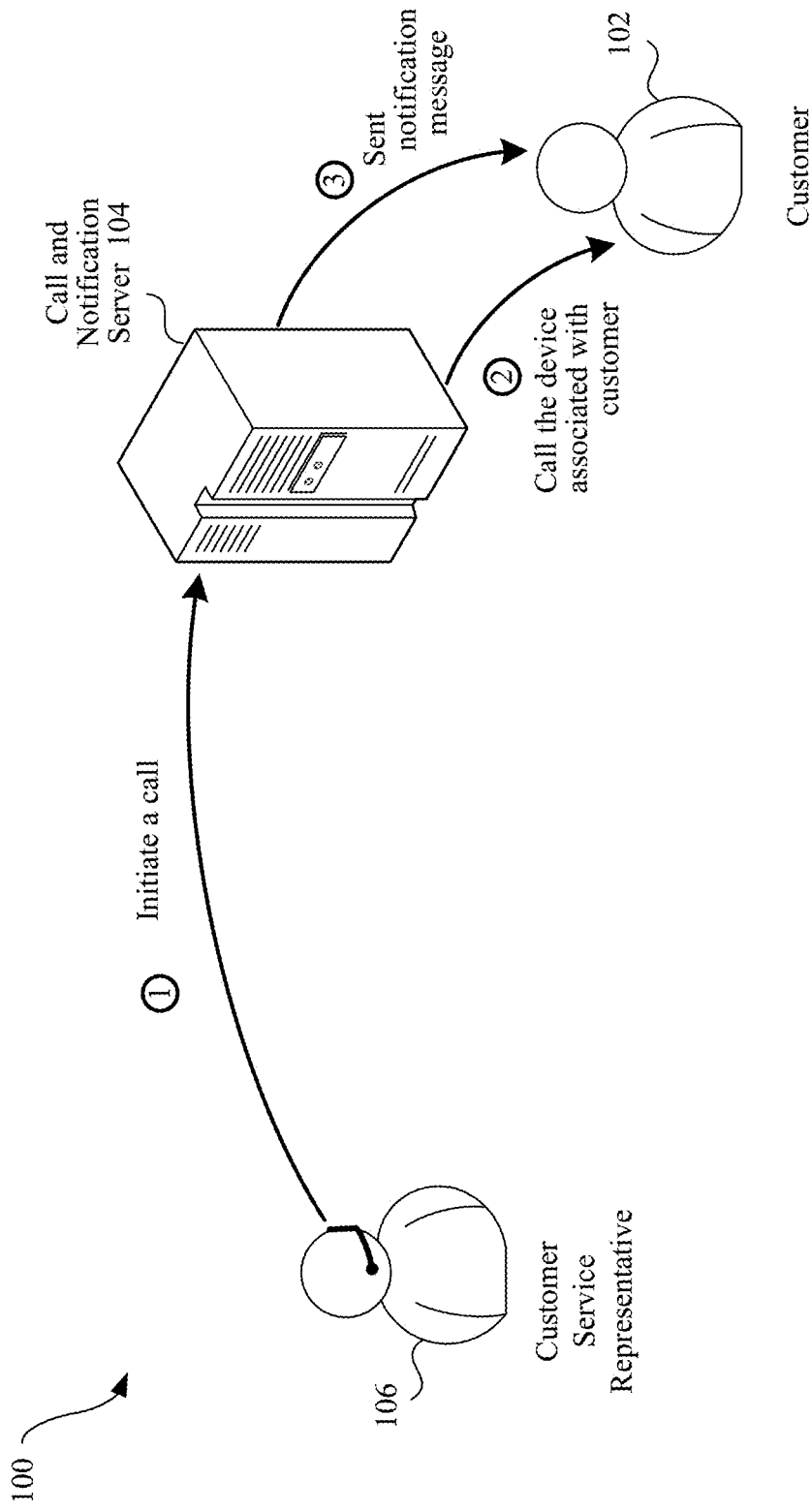
FIG. 1 shows an example overview of operations performed in a call and notification system for authentication.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

When a customer receives a call from a customer service representative (CSR) of a trustworthy organization (e.g., the customer's bank) the customer is unable to verify that the CSR is who he or she says. In some cases, fraudsters have been known to steal personal information and use it for nefarious purposes (e.g., taking out loans, filing fake tax returns, having a credit card sent to the fraudster's address).

To address at least this problem, this patent document describes technology that can allow a first person (e.g., a customer) to determine whether a call received from a second person (e.g., a CSR) is coming from a phone number associated with a trustworthy source (e.g., the customer's bank). For example, when a second person initiates a call via a call and notification server and the call is received by a first person, the call and notification server can also send a notification message to a user device associated with the first person. The notification message can be displayed on the user device, which allows the first person to determine whether the call received by the user device is associated with a trustworthy source. In some embodiments, the notification message can be sent simultaneously or near simultaneously with the initiation or reception of the call. For example, if a call is initiated at a certain time, the notification message can be sent within a pre-determined window of time (e.g., 30 seconds) immediately before or immediately after the time when the call is initiated via a call and notification server or the notification message can be sent within a pre-determined window of time (e.g., 30 seconds) immediately before or immediately after the time when the call is received by the user device. By sending the notification message within a pre-determined time window immediately before or after the initiation of the call, the CSR 102 can authenticate himself or herself to the customer 102 within the context of a call that the customer will receive or has received from the CSR.

In this patent document, the terms "customer service representative" and "customer" are used to simplify the description of the example authentication techniques. However, the authentication techniques described in this patent document can be applied in context other than where a customer service representative belonging to an organization (e.g., company) calls a customer of that organization. For example, by using the authentication techniques described in this patent document, a person can verify that it is indeed a governmental agency calling to verify benefits or obtain information when a governmental agency calls the person.

FIG. 1 shows an example overview of operations performed in a call and notification system 100 for authentication. In an example scenario, at operation 1, a CSR 106 can initiate a call to speak to a customer 102. At operation 2, the call and notification server 104 can initiate a call by dialing a number associated with the customer's user device (e.g., laptop or smartphone). At operation 3, which can be performed simultaneously or near simultaneously with operation 2, the call and notification server 104 can send a notification message to the customer 102.

The notification message can be generated by the call and notification server 104 to provide information to the customer 102 that can identify the source of the call. For example, the notification message can include a name of an organization (e.g., bank where the customer's account resides) and/or a phone number of the organization. The customer's user device can receive and display the notification message to the customer 102. Furthermore, the computer or a phone of the CSR 106 can use the phone number of the organization to communicate with the customer's user device so that the customer's user device can display the phone number to the customer 102 when the customer's user device receives the call from the CSR. Thus, by comparing the phone number in the notification message with the phone number displayed on the first device, the customer 102 can determine whether the call received at operation 2 is from a trustworthy source. In some embodiments, the notification message can include a reason or purpose of the call (e.g., recent fraudulent transaction or discuss insurance products).

The notification message can be sent to the first device via a text messaging service or via an application operating on the first device or via an electronic mail (e-mail) service received by the first device. Thus, a technical benefit of sending a notification message to the customer's user device is that it allows for an independent way of authenticating the CSR 106 that is not dependent on the CSR mentioning over the call that he or she is affiliated with a trustworthy organization. In other words, by sending the notification message via the call and notification server 104, the CSR 106 can independently demonstrate to the customer 102 that the CSR can access to the organization's systems that allow the CSR to contact the customer via multiple channels (e.g., via voice calls and either a text message, an application operating on the first device or an e-mail). Thus, when a customer 102 receives a call from the CSR 102 and also receives a notification message, the customer 102 can determine that the CSR is who he or she says he or she is.

In some embodiments, the customer 102 may determine whether to answer a call based on the customer's user device receiving a notification message prior to receiving the call. For example, prior to receiving the call at operation 2, the call and notification server 104 can send the notification message to the customer's user device. The content of the notification message can indicate that a CSR 106 will be calling the customer's user device from a trustworthy source. The CSR 106 may call the customer's user device within a pre-determined time window after a time when the notification message is sent to or received by the customer's user device.

A benefit of sending the notification message within a pre-determined time window immediately before the initiation of the call is that it can allow the second person to authenticate himself or herself to the first person within the context of a call that the first person will subsequently receive from second person. Thus, after the customer's user device receives the notification message, the user device may receive the call initiated by the call and notification server 104. In such embodiments, the user device can receive a selection from the customer 102 to answer the call (e.g., the customer selects "accept call" displayed on a graphical user interface (GUI) of a smartphone's display) after the notification message has been displayed.

In some embodiments, the customer 102 may determine whether to terminate an ongoing call with a CSR 106 based on the notification message received by the customer's user device during the call. For example, after receiving the call at operation 2, the CSR 106 may inform the customer 102 that the CSR will send a notification message to authenticate the CSR. Subsequently, the call and notification server 104 can send the notification message to the customer's user device, where the notification message is sent to or received by the customer's user device within a pre-determined time window after the call is initiated.

A benefit of sending the notification message within a pre-determined time window immediately after the initiation of the call is that it can allow the second person to authenticate himself or herself to the first person within the context of a call that the first person has received and answered from second person. Thus, after the customer's user device receives and displays the content of the notification message, the customer 102 can determine whether the CSR has acceptably authenticated himself or herself. In such embodiments, if the customer 102 determines that the CSR is not trustworthy, the user device can receive a selection from the customer 102 to terminate the call (e.g., the customer selects "end call" displayed on a GUI of a smartphone's display).

Figure 2:
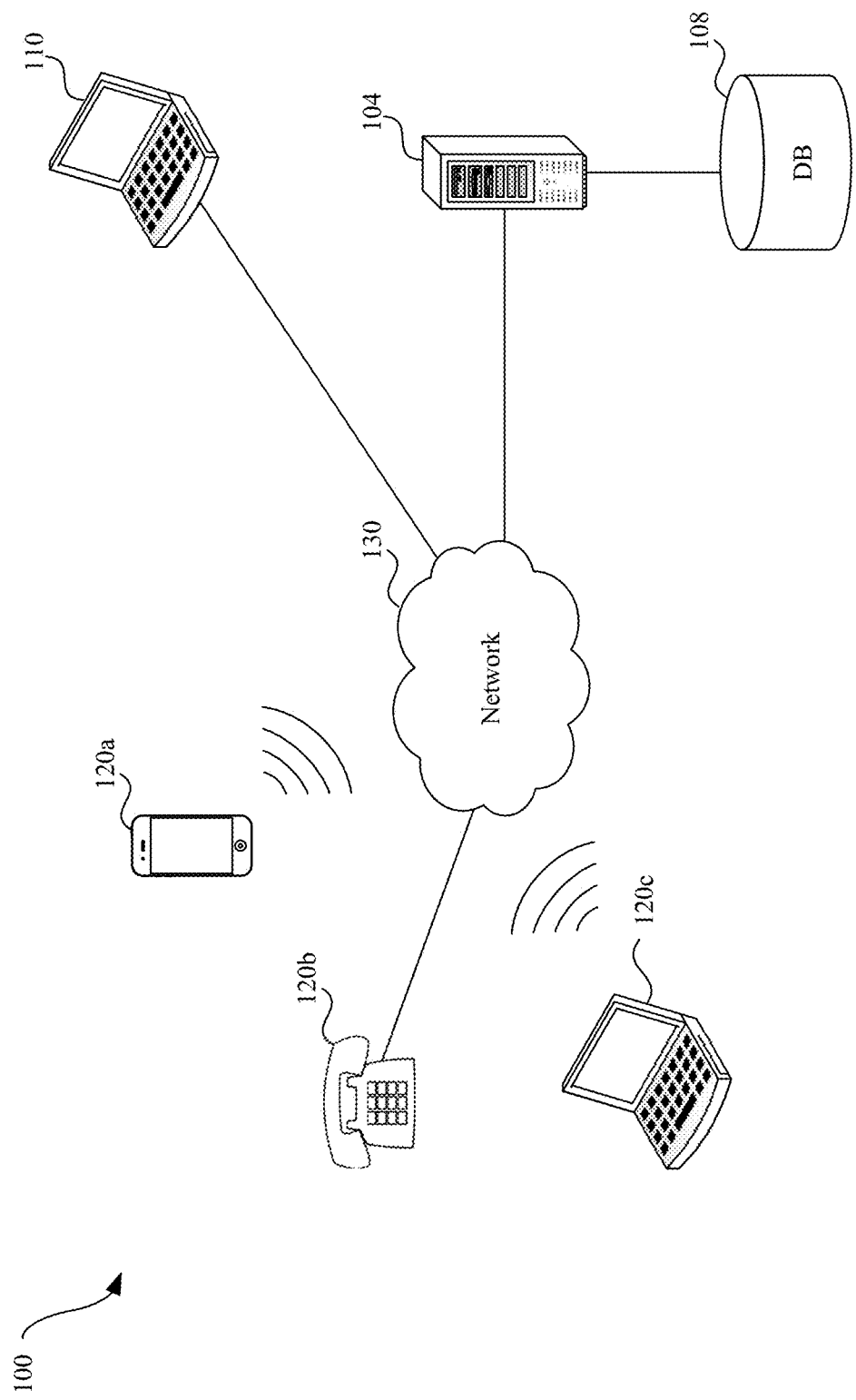
FIG. 2 shows an example block diagram of a call and notification system.

FIG. 2 shows an example block diagram of a call and notification system 100 that includes a CSR's computer 110 and/or phone that can initiate a call to speak to a customer via the customer's device 120a-120c (e.g., laptop, phone, wearable, or smartphone). The call from the CSR's computer 110 or phone can be sent to the customer's device 120a-102c via a communication network 130. The communication network 130 may include the Internet, a cellular network, a public switched telephone network (PSTN), a voice over Internet Protocol (VOIP) network, or any combination thereof. This patent document describes various operations performed by a call and notification server 104. In some embodiments, a single server can perform the operations described for the call and notification server 104. In some other embodiments, multiple servers can perform the operations described for the call and notification server 104. As further explained in this patent document, the call and notification server 104 can store information to and retrieve information from a database 108.

Figure 3:
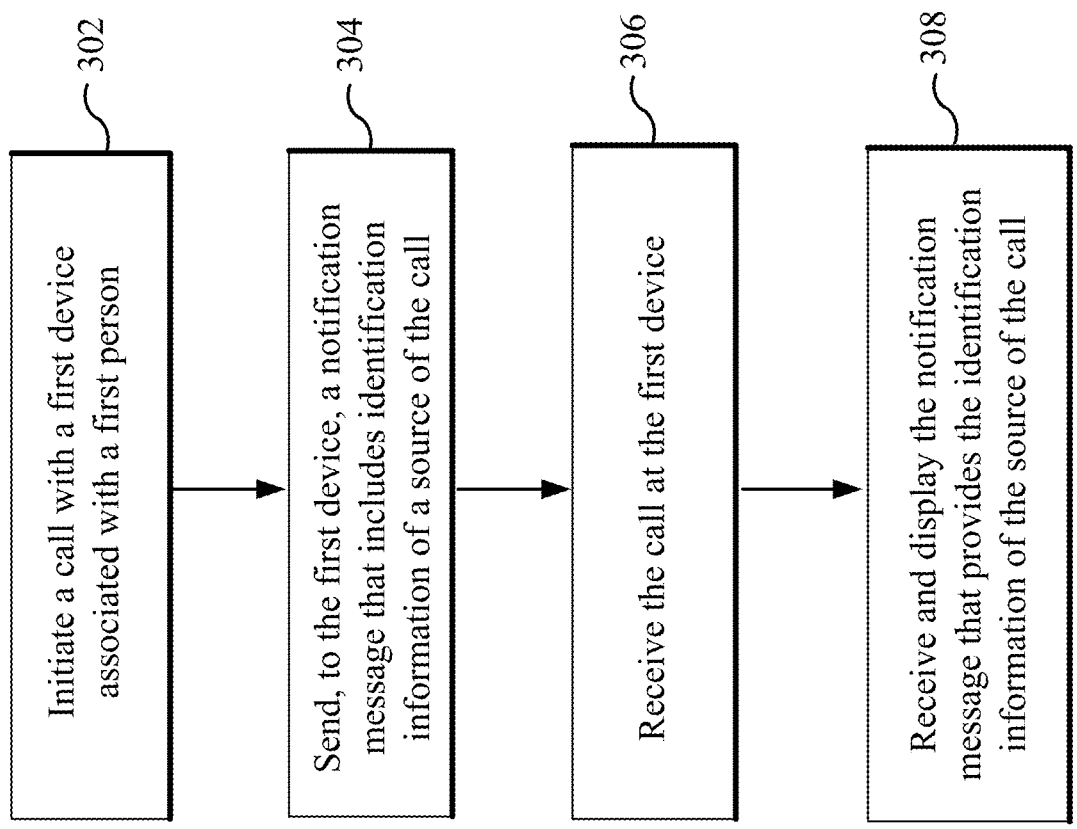
FIG. 3 is an example flow diagram of a call and notification process for performing authentication.

FIG. 3 is an example flow diagram of a call and notification process for performing authentication. Operations 302 to 304 are performed by a first application operating on server (e.g., call and notification server), and operations 306 to 308 are performed by a second application operating on a first device (e.g., smartphone or laptop) associated with a first person (e.g., a customer). At the initiating operation 304, a server is configured to initiate a call with a first device associated with a first person, where the call facilitates a communication between the first device and a second device (e.g., laptop or phone) associated with a second person (e.g., CSR). The server may receive a command to initiate a call from the second device of the second person. For example, a third application operating on the second device may receive a selection from the CSR to dial a number associated with the first device of the first person. The third application on the second device can send the CSR's selection to the server that initiates the call with the first device of the first person.

At the sending operation 304, the server is configured to send, to the first device, a notification message that includes identification information of a source of the call. The server can generate the notification message, which is sent by the server or received by the first device within a pre-determined time window immediately before or after a time when the call is initiated. For example, if a call is initiated at 2:00 pm, the notification message can be sent or received within a 2-minute window immediately before or after the time when the call is initiated. Continuing with the above example, the notification message can be sent between 1:58 pm to 2:00 pm or between 2:00 pm and 2:02 pm so that the first person can determine whether the second person who has or will be calling the first person is trustworthy.

In some embodiments, the content of the notification message may include identification information of the source of the call. The identification information of a source of a call may include a name of an organization and/or a phone number of the organization (e.g., customer service phone number associated with a company). The second device may be operable to use the phone number of the organization to communicate with the first device so that the first device can display the phone number to the first person. Thus, a first device can display to the first person the phone number of the call and the phone number included in the notification message for comparison and/or authentication. The notification message can be sent by the server and received by the first device via a text messaging service or via an application operating on the first device or via an electronic mail (e-mail) service.

At the receiving operation 306, the first device is configured to receive the call. At the receiving and displaying operation 308, the first device is configured to receive and display the notification message that provides the identification information of the source of the call.

In some embodiments, the notification message may be sent to the first person before the initiation of the call to allow the second person to authenticate himself or herself. In such embodiments, the first person can determine prior to the call whether the second person who will be calling the first person is trustworthy. Thus, the call and notification server can send the notification message informing the first person that the second person or an organization to which the second person belongs will be calling the first person. The first device is configured to display the notification message. In such embodiments, the first device can be configured to receive a selection to answer the call after the notification message is displayed. If the first person determines that the notification message does not authenticate the second person, then the first device can receive another selection from first person to not answer (or terminate) the call.

In some other embodiments, the notification message may be sent to the first person's device after the initiation of the call to allow the second person to authenticate himself or herself during the call. In such embodiments, the first person can review the content of the notification message to determine during the call whether the second person on the call with the first person is trustworthy. For example, after a first person answers the call from the second person, the second person can mention that he or she will send a push notification message to an application operating on the first device so that the first person can determine that the call is from a trustworthy source. Thus, the call and notification server can send the notification message to the first device informing the first person that the second person or an organization to which the second person belongs has initiated the call that the first person has answered. The first device is configured to display the notification message. In such embodiments, the first device can be further configured to receive another selection to terminate on ongoing call with the second person after the notification message is displayed. If the first person determines that the notification message authenticates the second person, then the first person can continue to speak to the second person on the call.

In some embodiments, the first device may receive and display additional information that can inform the first person that the source of the call is authenticated for example, a third party service provider (e.g., telecommunications provider). For example, the first device can be configured to receive a verification message that indicates that the source of the call is authenticated (e.g., the number has not been spoofed). The verification message may be displayed on the first device with the words "authenticated caller" or "verified caller" or other similar words. In other embodiments, the verification message can simply include the phone number of the origin of the call. The verification information can be provided by one or more call authentication systems operated by one or more call service providers (e.g., telecommunications companies) that facilitate the call between the first device and the second device. In some implementations, the verification message may be included in or added to the notification message. A benefit of sending a verification message to the customer's user device is that it can provide another way of authenticating the CSR calling the customer that is separate from the notification message sent by the call and notification server. Thus, a verification message can provide to a customer an additional and independent measure of confidence that the CSR to who whom the customer is speaking is trustworthy.

In some embodiments, the first device associated with the first person trigger an authentication process with the call and notification server. For example, after the first device receives a call that may be initiated by the call and notification server, a first person operating the first device can open an application operating on the first device to trigger authentication. The application operating on the first device may include a graphical user interface (GUI) that enables the first person to click on a button (e.g., the button may be displayed with the text "verify source of the call"). Upon receiving an indication that the first person has clicked on the button to trigger the authentication, the application displays a prompt that enables the first person to enter a passcode. The passcode can be any combination of letters, numbers, special characters and/or a shape from a predetermined list of shapes (e.g., triangle, circle, etc.,). The application on the first device can send the first person entered passcode to the call and notification server that can send the passcode to the second device associated with the second person. When the second person audibly repeats the entered passcode to the first person over the call, the first person can authenticate a source of the call (e.g., by selecting a "call authenticated" button on the application on the first device to authenticate the source of the call).

There are several technical advantages to triggering the authentication process as described above. By triggering the authentication using an application on the first device, the first device (and not the second device) can control the passcode selection process so that the first person can authenticate the second person. In such embodiments, an unauthorized person cannot use his or her device (e.g., a third device) to obtain the passcode from the application operating on the first device at least because the application on the first device sends the selected passcode to the call and notification server which sends the passcode to the second device which may be previously authorized by the call and notification server to communicate with the first device.

In some embodiments where the first device triggers an authentication process, as explained above, the second device associated with the second person can receive the selected passcode so that the second device can send back a message to the first device where the message includes the passcode typed in by the second person on the second device. When the first device receives the passcode sent by the second person, the application on the first device can determine if the passcode entered by the first person on the first device is the same as the passcode received from the second device. If the application on the first device determines that the two passcodes are the same, the application can display a message that a source of the call is authenticated. A benefit of using such an approach is that it can prevent an unauthorized person from watching a first person enter his or her passcode and audibly repeating the passcode back to the user. As mentioned above, a technical advantage of having the first device trigger the authentication process and by having the second device send a message in which the passcode is entered by the second person and sent back to the first device is that such a technique can rely on the call and notification server to establish that information sent from a first device to the second device (or vice versa) is sent to the proper recipient and not an unauthorized user's device.

Figure 5A:
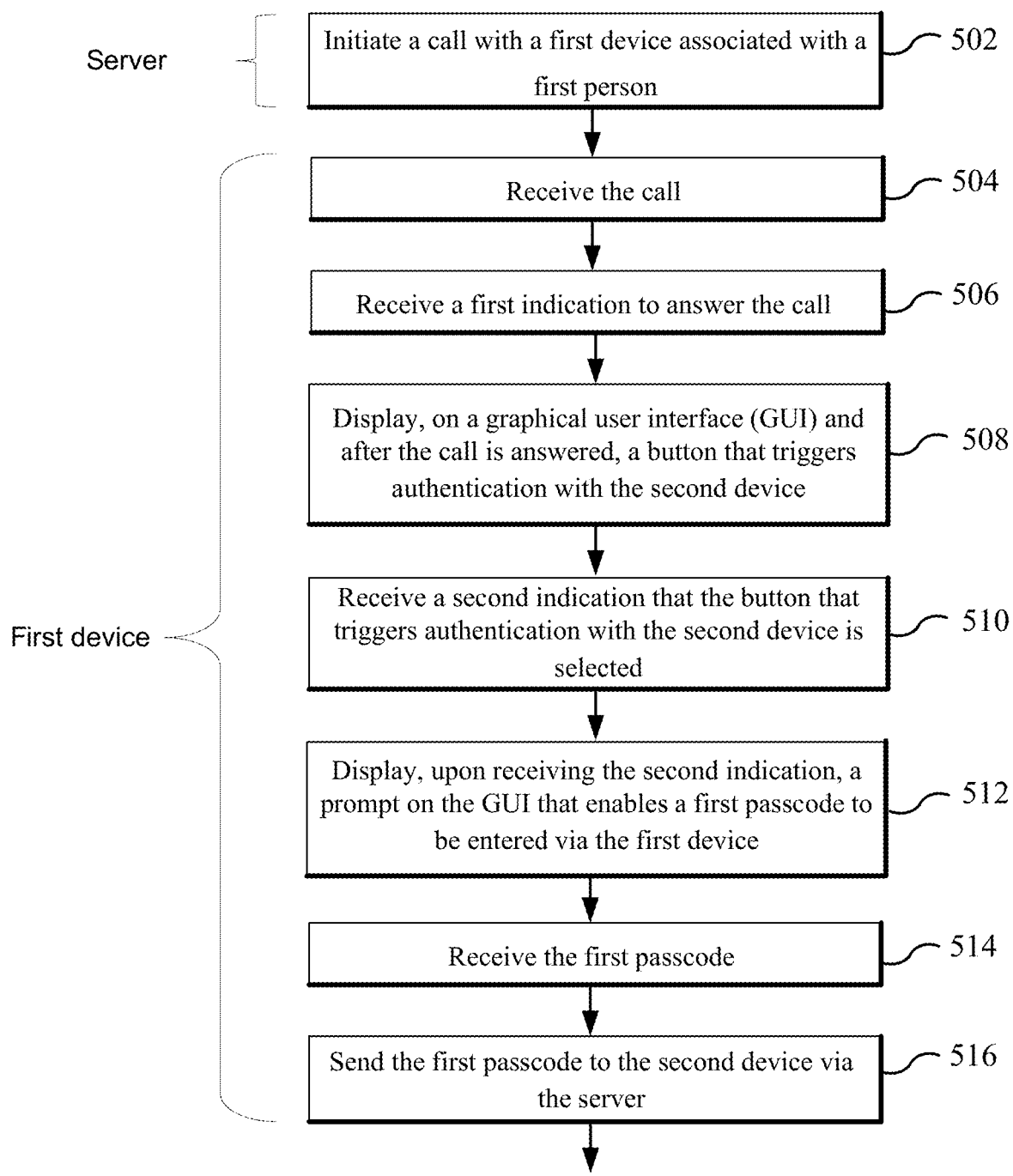
FIGS. 5A and 5B show another example flow diagram of a call and notification process for performing authentication.
Figure 5B:
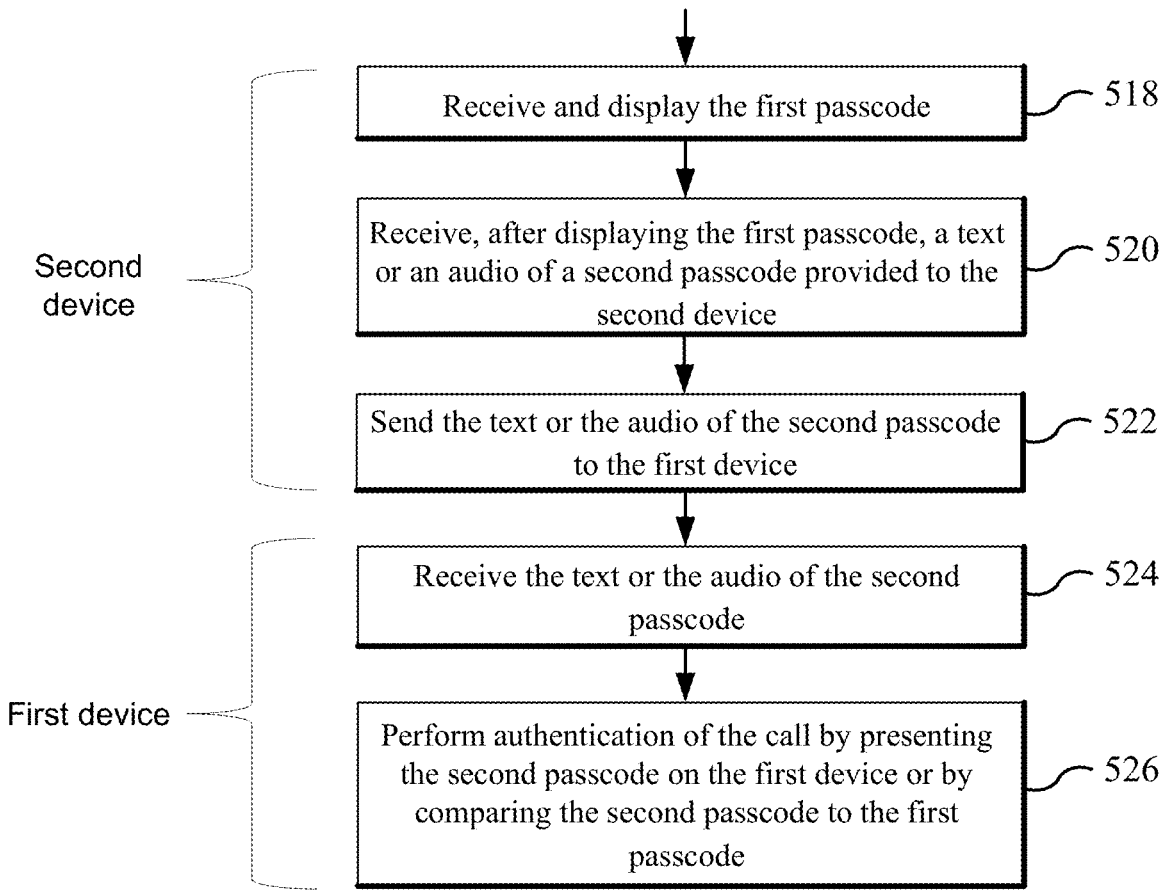

FIGS. 5A and 5B show another example flow diagram of a call and notification process for performing authentication. Operation 502 is performed by a first application operating on the call and notification server, operations 504 to 516 and 524 to 526 are performed by a second application operating on a first device (e.g., smartphone or laptop) associated with a first person (e.g., a customer), and operations 518 to 522 are performed by a third application operating on a second device (e.g., desktop or laptop) associated with a second person (e.g., CSR).

At operation 502, a first application operating on the call and notification server initiates a call with a first device associated with a first person. The call facilitates a communication between the first device and a second device associated with a second person.

At operation 504, a second application operating on the first device receive the call. At operation 506, the second application receive a first indication to answer the call. At operation 508, the second application displays, on a graphical user interface (GUI) and after the call is answered, a button that triggers authentication with the second device. At operation 510, the second application receives a second indication that the button that triggers authentication with the second device is selected. At operation 512, the second application displays, upon receiving the second indication, a prompt on the GUI that enables a first passcode to be entered via the first device. At operation 514, the second application receives the first passcode. At operation 516, the second application sends the first passcode to the second device via the server.

At operation 518, a third application operating on a second device receives and displays the first passcode. At operation 520, the third application receives, after displaying the first passcode, a text or an audio of a second passcode provided to the second device. The text includes the second passcode entered by the second person via a keyboard associated with the second device, and the audio includes audio content of the second password provided by the second person via a mic associated with the second device. At operation 522, the third application sends the text or the audio of the second passcode to the first device.

At operation 524, the second application receives the text or the audio of the second passcode. At operation 526, the second application performs authentication of the call by presenting the second passcode on the first device or by comparing the second passcode to the first passcode.

In some embodiments, the second application can perform the authentication operation at operation 526 by displaying the text of the second passcode on the GUI of the first device or by causing the audio of the second passcode to be played on a speaker of the first device. In such embodiments, if the first person determines that the displayed text or the audio of the second passcode is the same as the first passcode entered by the first person then the second application receives, via the GUI of the first device and after the second passcode is presented (e.g., displayed on the first device or played via the speaker of the first device), a selection of a second button that indicates that a source of the call is authenticated.

In some embodiments, the second application can perform the authentication operation at operation 526 by determining that the first passcode is the same as the second passcode, and displaying, on the GUI of the first device and after the determining, a message that indicates that a source of the call is authenticated. In some embodiments, the passcode includes letters, numbers, or a shape.

Figure 4:
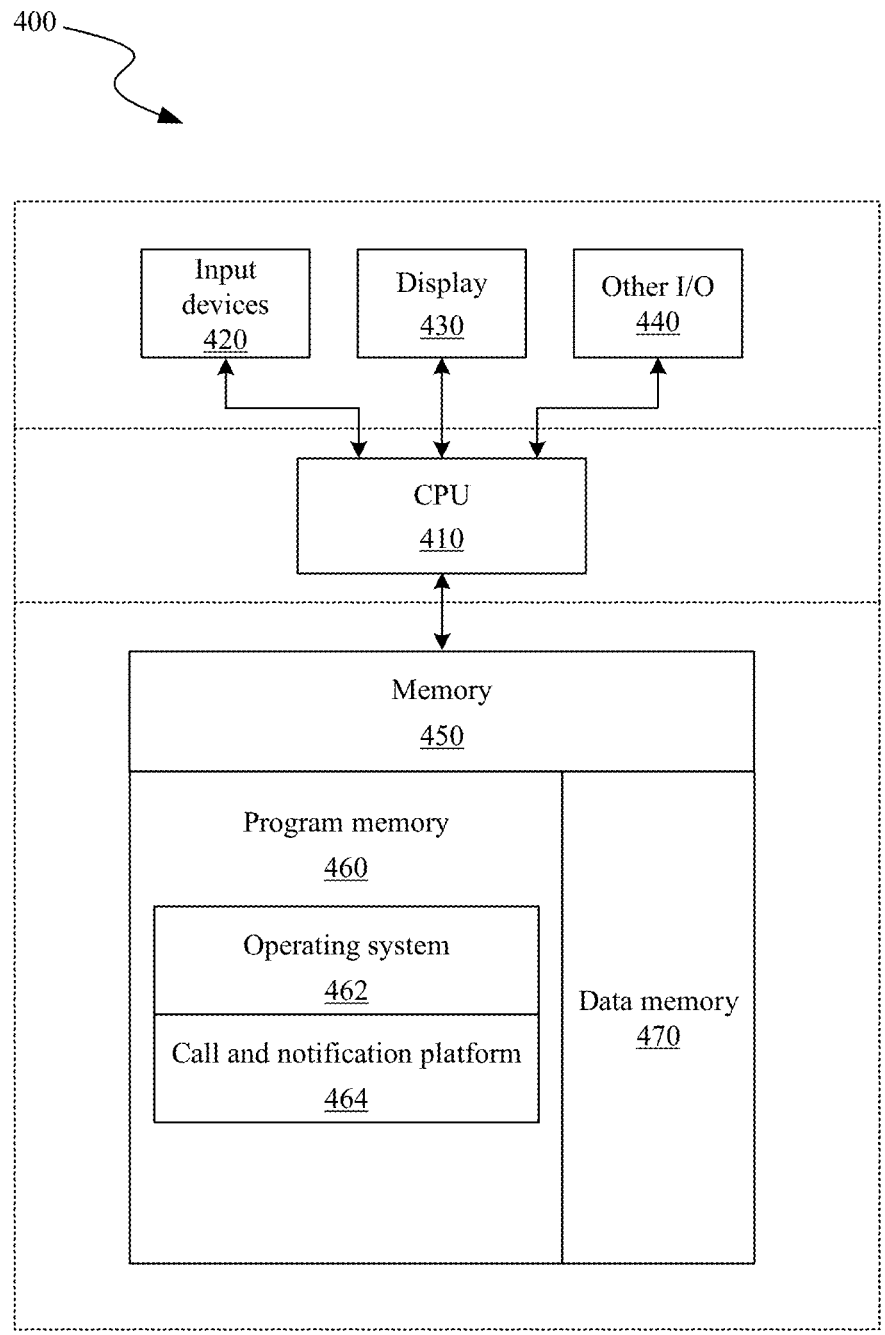
FIG. 4 is a block diagram illustrating an overview of devices on which some implementations of a notification server or customer device (or user device) can operate.

FIG. 4 is a block diagram illustrating an overview of devices on which some implementations of the call and notification server or customer's user device or CSR's device can operate. The devices can comprise hardware components of a device 400, such as the call and notification server or customer's user device or CSR's device, all of which can include a call and notification platform 464 that can allow a source of a call to be authenticated to a customer. For instance, one version of the call and notification platform 464 operating as a first application on the call and notification server can initiate a call between the customer and the CSR and can send a notification message to the customer's user device as explained in this patent document. And, another version of the call and notification platform 464 operating as a second application on the customer's user device can receive the call, receive and display the notification message, and/or receive and send passcode to the CSR's device as described in this patent document. Another version of the call and notification platform 464 operating as a third application on the CSR's device can receive a first passcode and can send a second passcode to the customer's user device for authentication as described in this patent document.

Device 400 can include one or more input devices 420 that provide input to the CPU (processor) 410, notifying it of actions. The actions are typically mediated by a hardware controller that interprets the signals received from the input device and communicates the information to the CPU 410 using a communication protocol. Input devices 420 include, for example, a mouse, a keyboard, a touchscreen, an infrared sensor, a touchpad, a wearable input device, a camera- or image-based input device, a microphone, or other user input devices.

CPU 410 can be a single processing unit or multiple processing units in a device or distributed across multiple devices. CPU 410 can be coupled to other hardware devices, for example, with the use of a bus, such as a PCI bus or SCSI bus. The CPU 410 can communicate with a hardware controller for devices, such as for a display 430. Display 430 can be used to display text and graphics. In some examples, display 430 provides graphical and textual visual feedback to a person operating the device 400. In some implementations, display 430 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 440 can also be coupled to the processor, such as a network card, video card, audio card, USB, FireWire or other external device, camera, printer, speakers, CD-ROM drive, DVD drive, disk drive, or Blu-Ray device.

In some implementations, the device 400 also includes a communication device capable of communicating wirelessly or wire-based with a network node (e.g., a server) or with a user device (e.g., a laptop, desktop, or mobile device) or with one or more computers (e.g., desktop or laptop) associated with the customer service representatives. The communication device can communicate with another device or a server through a network using, for example, TCP/IP protocols. Device 400 can utilize the communication device to distribute operations across multiple network devices.

The CPU 410 can have access to a memory 450. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 450 can include program memory 460 that stores programs and software, such as an operating system 462 and call and notification platform 464. The call and notification platform 464 may include modules or processes or methods, as described in FIGS. 1 to 3 and 5A-5B of this patent document and/or in the various embodiments in this patent document. Thus, for example, the memory 450 may store instructions that upon execution by CPU 410 configure the device 400 to perform the operations described for the call and notification server in FIGS. 1 to 3 and 5A-5B and/or in the various embodiments described in this patent document. In another example, the memory 450 may store instructions that upon execution by CPU 410 configure the device 400 to perform the operations described for the customer's user device in FIGS. 1 to 3 and 5A-5B and/or in the various embodiments described in this patent document. Memory 450 can also include data memory 470 that can include the various scores described in this patent document, which can be provided to the program memory 460 or any element of the device 400.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

In an example embodiment, the above-described methods are embodied in the form of processor-executable code and stored in a computer-readable program medium. Thus, a non-transitory machine-readable medium having machine executable instructions stored thereon that, when executed by one or more processors, direct the one or more processors to perform a method described in FIGS. 1 to 3 and 5A-5B and/or in the various embodiments described in this patent document.

Those skilled in the art will appreciate that the components illustrated in FIG. 1-4 described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A computing system for performing authentication, comprising:
a server comprising a processor configured to
initiate a call with a first device associated with a first person, wherein the call facilitates a communication between the first device and a second device associated with a second person;
wherein the first device comprises a processor configured to:
receive the call;
receive a first indication to answer the call;
after the call is answered, trigger authentication with the second device;
display a prompt on a graphical user interface (GUI) that enables a first passcode to be entered via the first device; and
send the first passcode to the second device via the server;
wherein the second device comprises a processor configured to:
receive the first passcode;
receive a text or an audio of a second passcode provided to the second device; and
send the text or the audio of the second passcode to the first device; and
wherein the processor of the first device comprising is further configured to:
receive the text or the audio of the second passcode; and
perform authentication of the call by:
presenting the second passcode on the first device, including:
presenting the second passcode by A) displaying the text of the second passcode on the GUI of the first device or B) playing the audio of the second passcode on a speaker of the first device; and
receiving, via the GUI of the first device and after the second passcode is presented, an indication that a source of the call is authenticated; or
comparing the second passcode to the first passcode, including:
determining that the first passcode matches the second passcode; and
in response to the determining that the first passcode matches the second passcode, providing a message that indicates that a source of the call is authenticated.

2. The computing system of claim 1,
wherein the performing the authentication of the call includes the presenting the second passcode on the first device; and
wherein the indication that the source of the call is authenticated is received via a selection of a button that indicates that the source of the call is authenticated.

3. The computing system of claim 1, wherein the triggering the authentication with the second device includes:
displaying a button on the GUI of the first device; and
in response to a selection of the button, triggering the authentication with the second device.

4. The computing system of claim 3, wherein the prompt that enables the first passcode to be entered is displayed in response to the selection of the button.

5. The computing system of claim 1, wherein the first passcode includes letters, numbers, or a shape.

6. The computing system of claim 1,
wherein the performing the authentication of the call includes the comparing the second passcode to the first passcode; and
wherein the message is sent via a telecommunications service provider of the call.

7. The computing system of claim 1,
wherein the performing the authentication of the call includes the comparing the second passcode to the first passcode; and
wherein the message includes verification information for a telecommunications service provider of the call.

8. A method of performing authentication, comprising:
receiving, by a first device, a call initiated by a server, wherein the call facilitates a communication between the first device and a second device;
after the call is answered, triggering authentication with the second device;
displaying a prompt on a graphical user interface (GUI) that enables a first passcode to be entered via the first device;
sending the first passcode to the second device;
receiving a text or an audio of a second passcode sent by the second device; and
performing authentication of the call by:
presenting the second passcode on the first device, including:
presenting the second passcode by A) displaying the text of the second passcode on the GUI of the first device or B) playing the audio of the second passcode on a speaker of the first device; and
receiving, via the GUI of the first device and after the second passcode is presented, an indication that a source of the call is authenticated; or
comparing the second passcode to the first passcode, including:
determining that the first passcode matches the second passcode; and
in response to the determining that the first passcode matches the second passcode, providing a message that indicates that a source of the call is authenticated.

9. The method of claim 8,
wherein the performing the authentication of the call includes the presenting the second passcode; and
wherein the indication that the source of the call is authenticated is received via a selection of a button that indicates that the source of the call is authenticated.

10. The method of claim 8, wherein the triggering the authentication with the second device includes:
displaying a button on the GUI of the first device; and
in response to a selection of the button, triggering the authentication with the second device.

11. The method of claim 10, wherein the prompt that enables the first passcode to be entered is displayed in response to the selection of the button.

12. The method of claim 8, wherein the second passcode includes letters, numbers, or a shape.

13. The method of claim 8,
wherein the performing the authentication of the call includes the comparing the second passcode to the first passcode; and
wherein the message is sent via a telecommunications service provider of the call.

14. The method of claim 13, wherein the message includes verification information for the telecommunications service provider.

15. A computer-readable memory having machine executable instructions stored thereon that, when executed by one or more processors, direct the one or more processors to perform a process comprising:
receiving, by a first device, a call initiated by a server, wherein the call facilitates a communication between the first device and a second device;
after the call is answered, triggering authentication with the second device;
displaying a prompt on a graphical user interface (GUI) that enables a first passcode to be entered via the first device;
sending the first passcode to the second device;
receiving a text or an audio of a second passcode sent by the second device; and
performing authentication of the call by:
presenting the second passcode on the first device, including:
presenting the second passcode by A) displaying the text of the second passcode on the GUI of the first device or B) playing the audio of the second passcode on a speaker of the first device; and
receiving, after the second passcode is presented, an indication that a source of the call is authenticated; or
comparing the second passcode to the first passcode, including:
determining that source of the call is authenticated by determining that the first passcode matches the second passcode.

16. The computer readable memory of claim 15,
wherein the performing the authentication of the call includes the presenting the second passcode; and
wherein the indication that the source of the call is authenticated is received via a selection of a button that indicates that the source of the call is authenticated.

17. The computer readable memory of claim 15, wherein the triggering the authentication with the second device includes:
displaying a button on the GUI of the first device; and
in response to a selection of the button, triggering the authentication with the second device.

18. The computer-readable memory of claim 17, wherein the prompt that enables the first passcode to be entered is displayed in response to the selection of the button.

19. The computer readable memory of claim 15, wherein the first passcode includes letters, numbers, or a shape.

20. The computer readable memory of claim 15, wherein the message is sent by a telecommunications service provider of the call and includes verification information associated with the telecommunications service provider.

* * * * *